(12) United States Patent
Usui et al.

(10) Patent No.: US 7,847,816 B2
(45) Date of Patent: Dec. 7, 2010

(54) IMAGING APPARATUS

(75) Inventors: Tsutomu Usui, Yokohama (JP); Norihiko Nakano, Fujisawa (JP); Junji Kamimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1535 days.

(21) Appl. No.: 11/114,523

(22) Filed: Apr. 25, 2005

(65) Prior Publication Data
US 2005/0285945 A1    Dec. 29, 2005

(30) Foreign Application Priority Data
Jun. 25, 2004    (JP) .............................. 2004-187226

(51) Int. Cl.
*H04N 13/00* (2006.01)
(52) U.S. Cl. ...................................... 348/42
(58) Field of Classification Search ............. 348/42–49, 348/72; H04N 13/00
See application file for complete search history.

(56) References Cited

U.S. PATENT DOCUMENTS

| | | | |
|---|---|---|---|
| 4,734,756 A * | 3/1988 | Butterfield et al. ............. 348/43 |
| 5,627,582 A | 5/1997 | Muramoto et al. |
| 6,147,707 A * | 11/2000 | Terasawa et al. .......... 348/229.1 |
| 6,205,259 B1 * | 3/2001 | Komiya et al. ............... 382/284 |
| 6,549,650 B1 * | 4/2003 | Ishikawa et al. ............. 382/154 |
| 7,027,085 B2 * | 4/2006 | Watanabe ................. 348/218.1 |
| 2001/0028498 A1 * | 10/2001 | Haga et al. ................... 359/407 |
| 2003/0160877 A1 * | 8/2003 | Sumida .................... 348/223.1 |

FOREIGN PATENT DOCUMENTS

| | | |
|---|---|---|
| CN | 1407792 A | 4/2003 |
| JP | 07-007653 | 1/1995 |
| JP | 08-265802 | 10/1996 |
| JP | 11-027701 A | 1/1999 |
| JP | 11-032982 A | 2/1999 |
| JP | 2000-152051 | 5/2000 |
| JP | 2000-261830 | 9/2000 |

(Continued)

OTHER PUBLICATIONS

China State Intellectual Property Office (SIPO) office action for SIPO patent application 2005-100694634 (Nov. 20, 2009).

(Continued)

*Primary Examiner*—Tung Vo
(74) *Attorney, Agent, or Firm*—Townsend and Townsend and Crew LLP

(57) ABSTRACT

In an imaging apparatus having two imaging devices, a converter module which synthesizes the two signals of each horizontal line produced from the two imaging devices to thereby convert the two signals into a single composite signal, a line memory which cooperates with the converter module to convert the signals, a line delay module which accumulates the output signals from the converter module, a line memory which cooperates with the line delay module to accumulate the signals, an exposure controller, an auto focus controller, a white balance controller, a color signal processor module, a luminance signal processor module, and an arithmetic processor module for stereo imaging process, the output signals from the plurality of imaging devices are converted to the single composite signal and processed on a one-channel processing basis.

11 Claims, 10 Drawing Sheets

FOREIGN PATENT DOCUMENTS

| | | |
|---|---|---|
| JP | 2002-032746 A | 1/2002 |
| JP | 2003-061075 A | 2/2003 |
| JP | 2003-158659 A | 5/2003 |
| JP | 2003-295044 A | 10/2003 |
| JP | 2004-147190 A | 5/2004 |

OTHER PUBLICATIONS

Japan Patent Office (JPO) office action for JPO patent application JP2004-187226 (Aug. 21, 2009).

* cited by examiner

IMAGING APPARATUS

INCORPORATION BY REFERENCE

The present application claims priority from Japanese application JP2004-187226 filed on Jun. 25, 2004, the content of which is hereby incorporated by reference into this application.

BACKGROUND OF THE INVENTION

The present invention relates to an imaging apparatus.

A prior art of this technical field is disclosed in, for example, JP-A-7-7653. This gazette describes as an objective of the invention that "it is an objective of the invention to provide an imaging apparatus in which a signal processor having a smaller number of elements than the number of imaging devices is used to process the signals from the imaging devices so that the consumption power, the number of elements used and the cost of multi-input/output can be reduced as compared to the prior arts proposed so far." In addition, it describes as its constitutional elements that "the imaging apparatus has n solid-state imaging devices, a first signal selector connecting the n imaging devices and k signal processors, the k signal processors, a second signal selector connecting the k signal processors and m output devices, and a controller for controlling the first and second signal selectors and the signal processors."

SUMMARY OF THE INVENTION

A combination of a plurality of imaging devices can be considered as a construction of camera. There are, for example, a surveillance camera having cameras housed in one box to pick up objects in different directions, and a stereo camera having two cameras provided to utilize their azimuth difference in the same direction. When such kinds of camera are produced, a smaller number of camera signal processors than the number of imaging devices are used as in JP-A-7-7653 and process the signals from the imaging devices in a time sharing manner to reduce the cost of the hardware, the number of parts used and the consumption power.

The conventional cameras have so far employed imagers of at most half a million pixels for recording a television signal, but recently digital cameras have been developed for high resolution. Digital cameras using an imager of several millions of pixels have come into existence, and they are now popular and are also beginning to be used in the field of surveillance camera. However, the higher the resolution, the more the high-resolution imager takes time to read the signal. Therefore, the one-frame period becomes long and the dynamic resolution is reduced. Thus, it can be considered that a high-resolution imager is used for high spatial resolution and a standard-resolution imager used for high dynamic resolution.

However, if we consider, for example, an imaging apparatus that has a high-resolution imager and a standard-resolution imager provided within a single housing and switched in a time-sharing manner, a problem occurs as will be described below. That is, since the prior art processes the signals from those imagers in a time-sharing manner, the signal processing time assigned to each imager is halved so that the dynamic resolution is inevitably reduced when the imagers are operated to pick up as in the surveillance camera or stereo camera.

It is an objective of the invention to provide an imaging apparatus in which the resolution can be increased in view of the above aspects.

According to the invention, there is provided an imaging apparatus having two imaging devices, converter means that receives the output signals of each horizontal line from the two imaging devices and cooperates with a line memory to synthesize the output signals of each horizontal line from the imaging devices to thereby convert the signals into a single composite signal of each horizontal line, thus producing it, and a single camera signal processor that processes the output signal from the converter means to produce a video signal containing at least a luminance signal.

According to the invention, the imaging apparatus can be constructed to increase the picture quality.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Embodiments of the invention will be described below.

Figure 1:
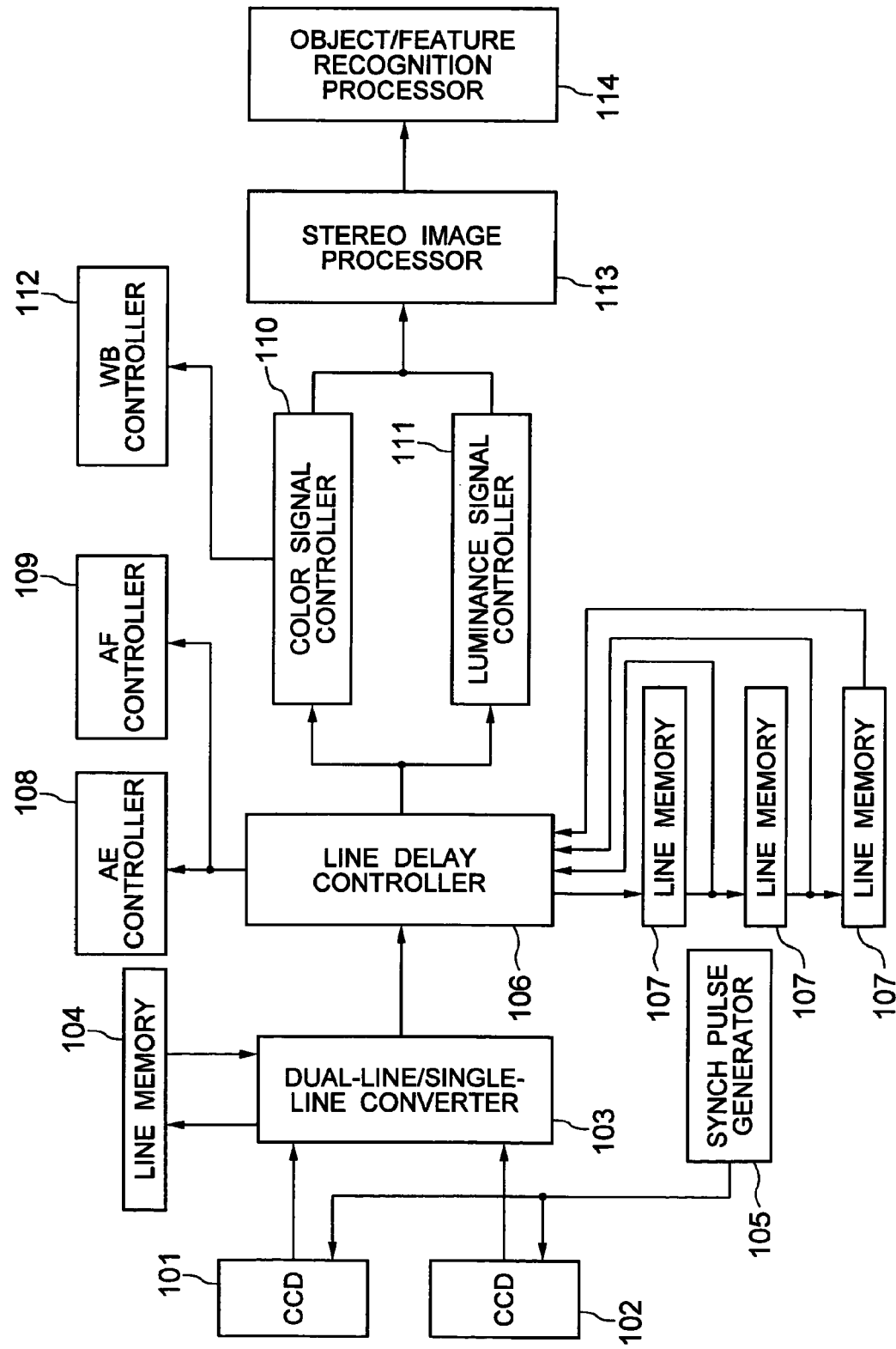
FIG. 1 is a block diagram showing the construction of the first embodiment of an imaging apparatus according to the invention.

FIG. 1 is a block diagram of the imaging apparatus showing the first embodiment of the invention.

Referring to FIG. 1, a first imaging device (hereinafter, referred to as CCD) 101 and a second CCD 102 both driven by synch pulse generator means 105 produce image signals as a result of picking up objects in a scene. The two produced signals are synthesized by using dual-line/single-line converter means 103 and a line memory 104 to form a single composite signal. Line delay control means 106 and line memories 107 accumulates this composite signal of each horizontal line fed one after another over several lines from the dual-line/single-line converter means 103, and then supplies the accumulated composite signals of several lines to exposure control means (hereinafter, called AE controller) 108 and focus control means (hereinafter, called AF controller) 109 where exposure control and auto focus control are made. In addition, white balance control means (hereinafter, called WB controller) 112 makes white balance control by using the signal from color signal control means (hereinafter, called CP processor) 110. Also, luminance signal processor means (hereinafter, called YP) 111 makes luminance signal process. The signals passed through the color signal process and luminance signal process are fed to stereo image processor means 113 where they are processed for stereo image. The stereo signal thus obtained is fed to object/feature recognition processor means 114, which measures distance, and recognizes objects and features.

Figure 2:
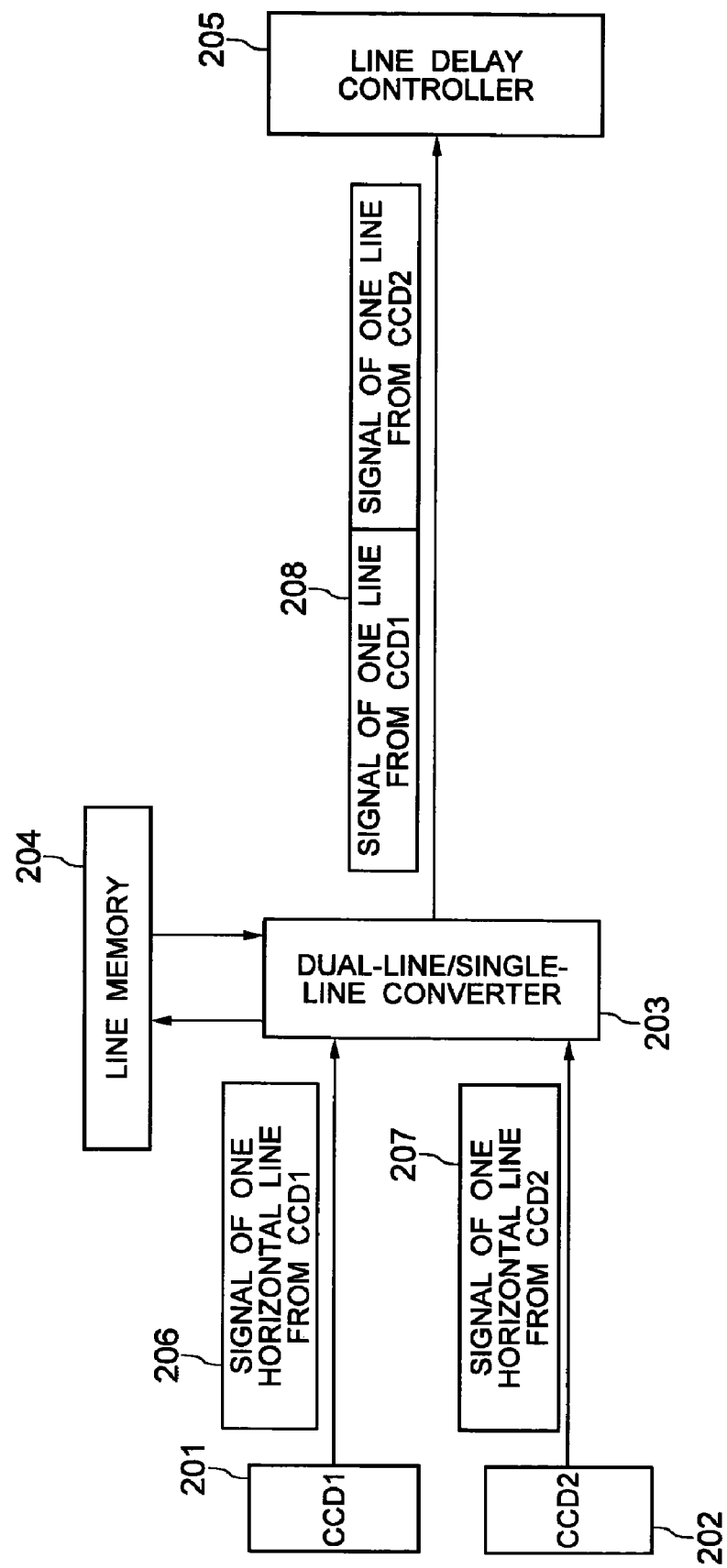
FIG. 2 is a block diagram showing a first method for processing the signals from two CCDs in this invention.

FIG. 2 shows the flow of signals in the construction of the first embodiment. In this case, the signal from the first CCD 201 and the signal from the second CCD 202 are synthesized to form a single composite signal. Referring to FIG. 2, reference numeral 208 represents the single composite signal formed by synthesizing the two signals of each horizontal line produced from the two CCDs.

A signal 206 produced from the first CCD 201 and a signal 207 produced from the second CCD 202 are supplied through dual-line/single-line converter means 203 to a line memory 204 where they are stored, and the signals are read out together from the line memory 204 so that the two horizontal lines can be converted to a single horizontal line. Thus, the signals produced from the two CCDs are converted to a single composite signal, which is then fed to line delay control means 205.

Figure 3:
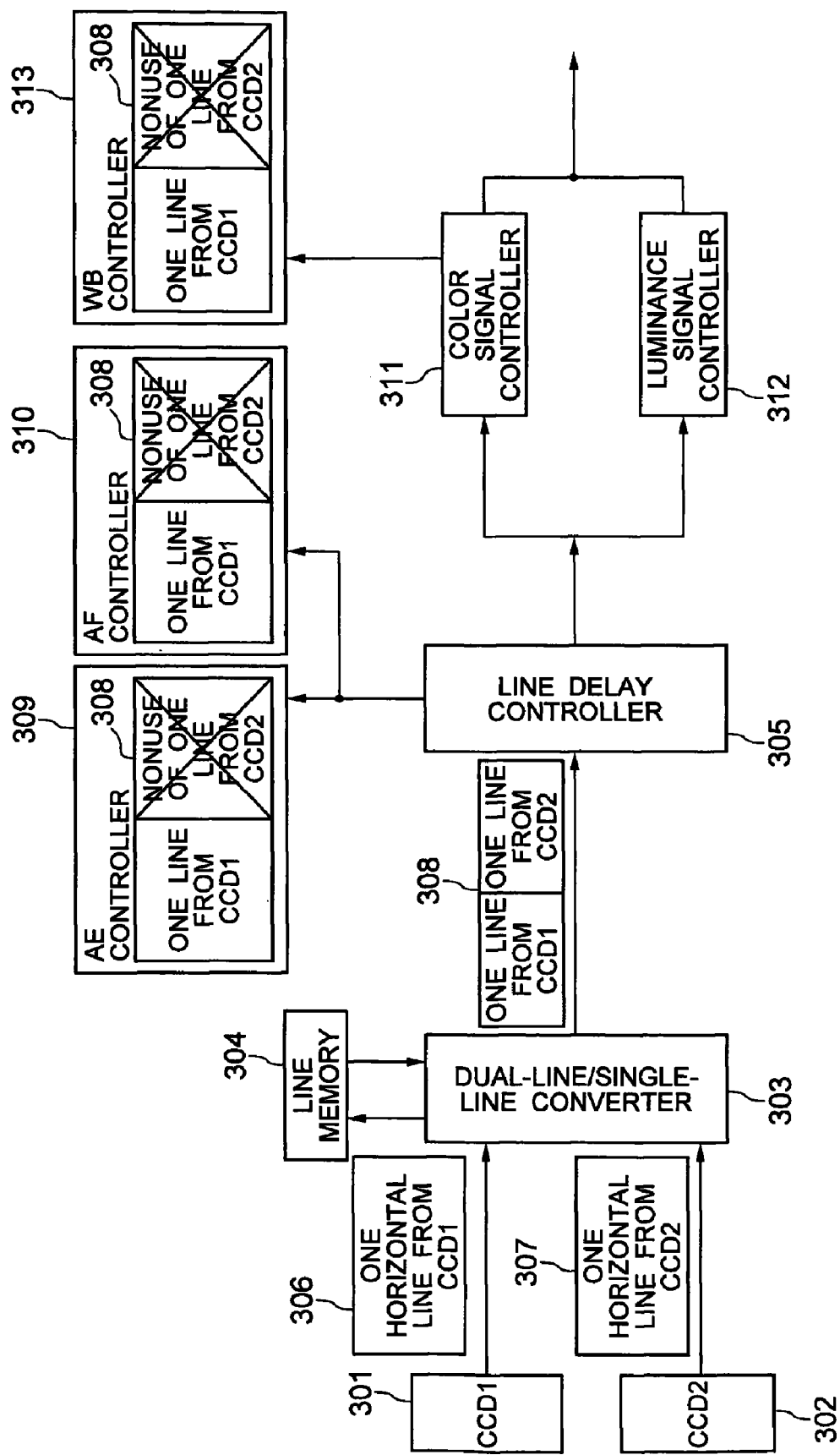
FIG. 3 is a block diagram showing the second flow of signals from the two CCDs in this invention.

FIG. 3 shows the flow of signals in the construction of the second embodiment. In this case, AE control, AF control and WB control are made by using either one of the signals from the first and second CCDs after the signals from the first and second CCDs are synthesized into the single composite signal.

In FIG. 3, 308 represents the composite signal into which the two signals 306 and 307 of each horizontal line produced from the two CCDs 301 and 302 are synthesized by the dual-line/single-line converter means 303. 309 designates the AE control means that makes AE control by using only one CCD signal of the composite signal 308 formed by the combination of the two line signals. Similarly, 310 is the AF control means that makes AF control by only one CCD signal of the composite signal 308 formed by the combination of the two line signals, and 313 the WB control means that makes WB control by using only one CCD signal of the composite signal 308 formed by the combination of the two line signals.

The dual-line/single-line converter means 303 synthesizes the two signals 306 and 307 of each horizontal line from the two CCDs 301 and 302 in the same way as in the first embodiment of FIG. 2. The resulting composite signal 308 is supplied through line delay control means 305 to the AE control means 309 and AF control means 310. Although the composite signal 308 of the signals 306 and 307 from the two CCDs 301 and 302 is fed to the AE control means 309 and AF control means 310, the AE control or AF control can be performed by selecting either one of the signal 306 fed from the first CCD 301 and signal 307 fed from the second CCD 302. In addition, as the AE control is performed, the WB control can be performed by selecting either one of the signals fed from color signal processor means 311 to WB control means 313. In FIG. 3, an example of the above case is shown. That is, the AE control means, AF control means and WB control means select from the composite signal fed thereto the signal that the first CCD 301 has produced, but those means do not use the signal that the second CCD 302 has produced.

Figure 4:
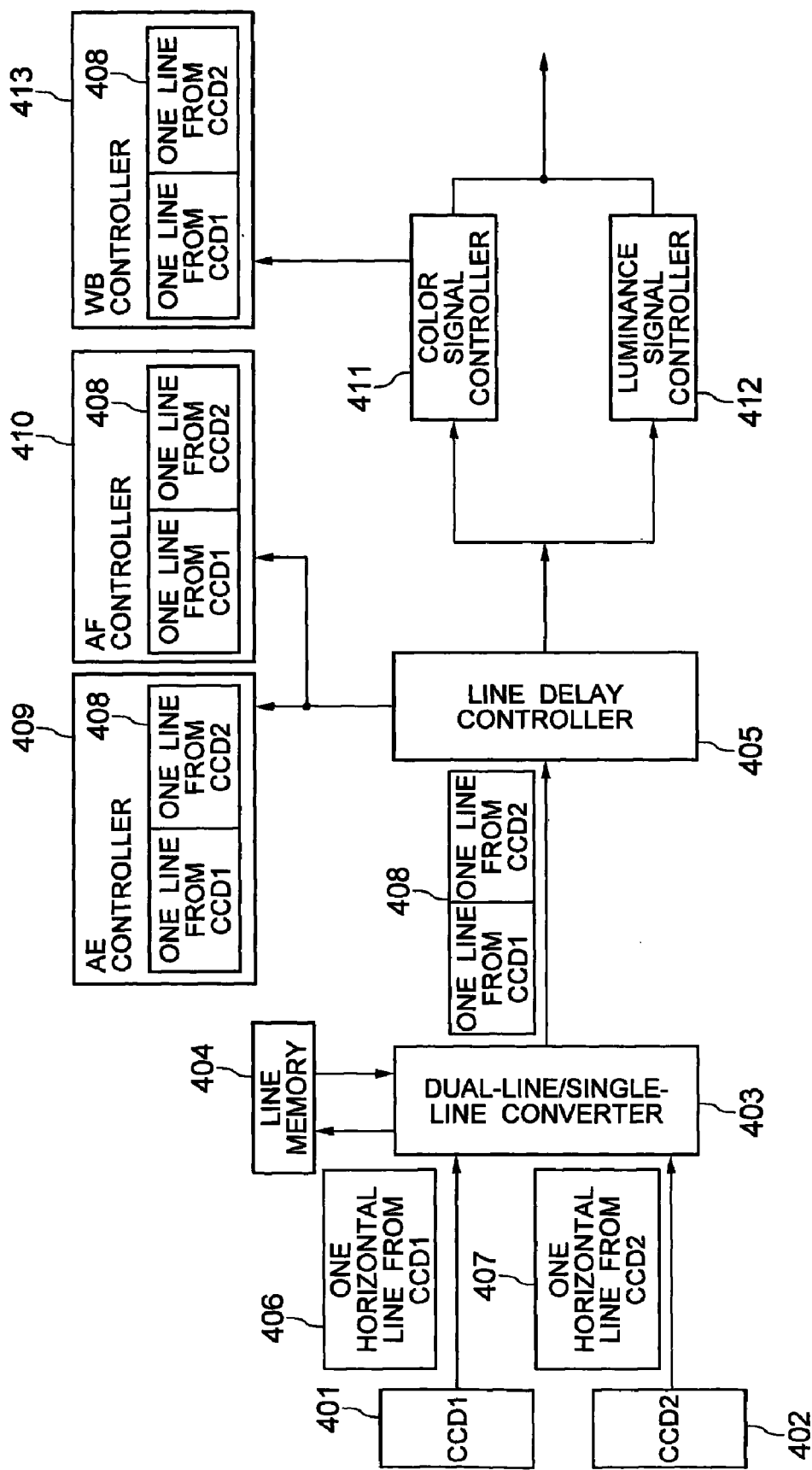
FIG. 4 is a block diagram showing the third flow of signals from the two CCDs in this invention.

FIG. 4 shows the flow of signals in the construction of the third embodiment. In this case, the AE control, AF control and WB control are made by using the average of the signals that are included in the composite signal of the signals 406 and 407 produced from the first and second CCDs 401 and 402.

In FIG. 4, 408 represents the composite signal formed by synthesizing the two signals 406 and 407 of each horizontal line produced from the two CCDs 401 and 402, and 409 the AE control means that makes AE control by using the composite signal 408 of the two horizontal lines. In addition, 410 denotes the AF control means that makes AF control by using the composite signal 408 of the two horizontal lines, and 413 the WB control means that makes WB control by using the composite signal of the two horizontal lines.

Dual-line/single-line converter means 403 converts the two CCD signals to the single composite signal 408 in the same way as in the first embodiment of FIG. 2. The composite signal 408 is supplied through a line delay controller 405 to the AE control means 409 and AF control means 410. The AE control means 409 and AF control means 410 make AE control and AF control by using the average of the two signals 406 and 407 produced from the first and second CCDs 401 and 402. As the AE control means makes AE control, the WB control means 413 also makes WB control by using the average of the two signals 406 and 407 produced from the first and second CCDs when the composite signal of the two signals is supplied through color signal control means 411 to the WB control means 413. In FIG. 4, an example of the above case is shown. That is, the AE control means, AF control means and WB control means make control by using the average of the two signals of the composite signal fed thereto.

Figure 5:
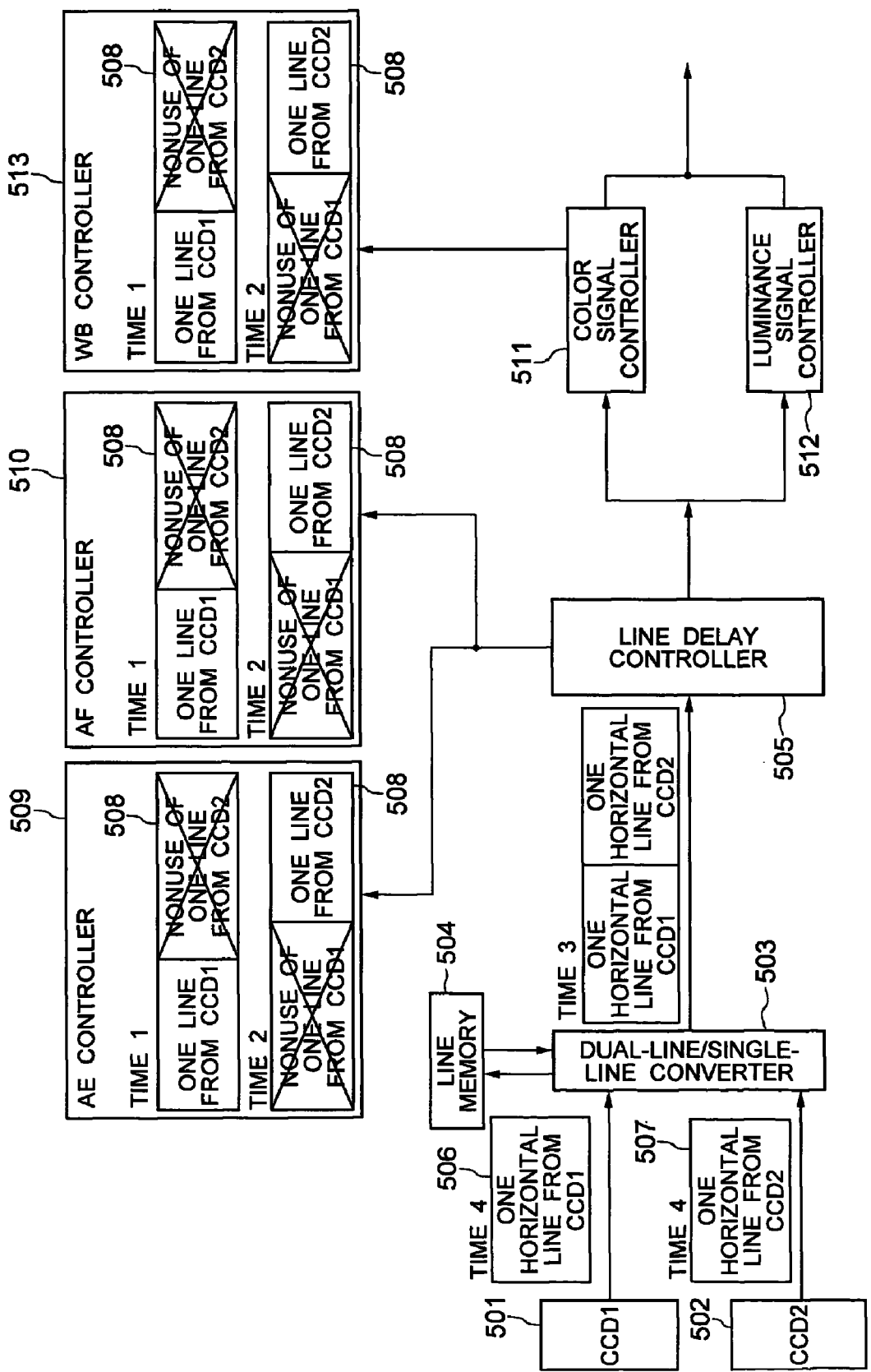
FIG. 5 is a block diagram showing the fourth flow of signals from the two CCDs in this invention.

FIG. 5 shows the flow of signals in the construction of the fourth embodiment. In this case, the AE control, AF control and WB control are made by selecting either one of the signals 506, 507, while sequentially switching those signals, of the single composite signal that is formed when the signal 506 from the first CCD 501 and the signal 507 from the second CCD 502 are synthesized.

In FIG. 5, 508 represents the composite signal formed when dual-line/single-line converter means 503 synthesizes the two signals 506 and 507 of each horizontal line produced from the two CCDs 501 and 502, and 509 is AE control means that makes AE control by selecting either one of the two signals, while sequentially switching those signals, of the composite signal 508 formed when the signals 506 and 507 of each horizontal line from the first and second CCDs 501 and 502 are synthesized. In addition, 510 designates AF control means that, as the AE control means makes control, makes AF control by selecting either one of the two signals, while sequentially switching those signals, of the composite signal formed when the signals from the first and second CCDs are synthesized. 513 is WB control means that, as the AE control means makes control, makes control by selecting either one of the two signals, while sequentially switching those signals, of the composite signal formed when the signals from the two CCDs are synthesized.

In FIG. 5, an example of the above case is shown. That is, the AE control means, AF control means and WB control means make control by selecting either one of the two CCD signals, while sequentially switching those signals, of the composite signal fed thereto.

Figure 6:
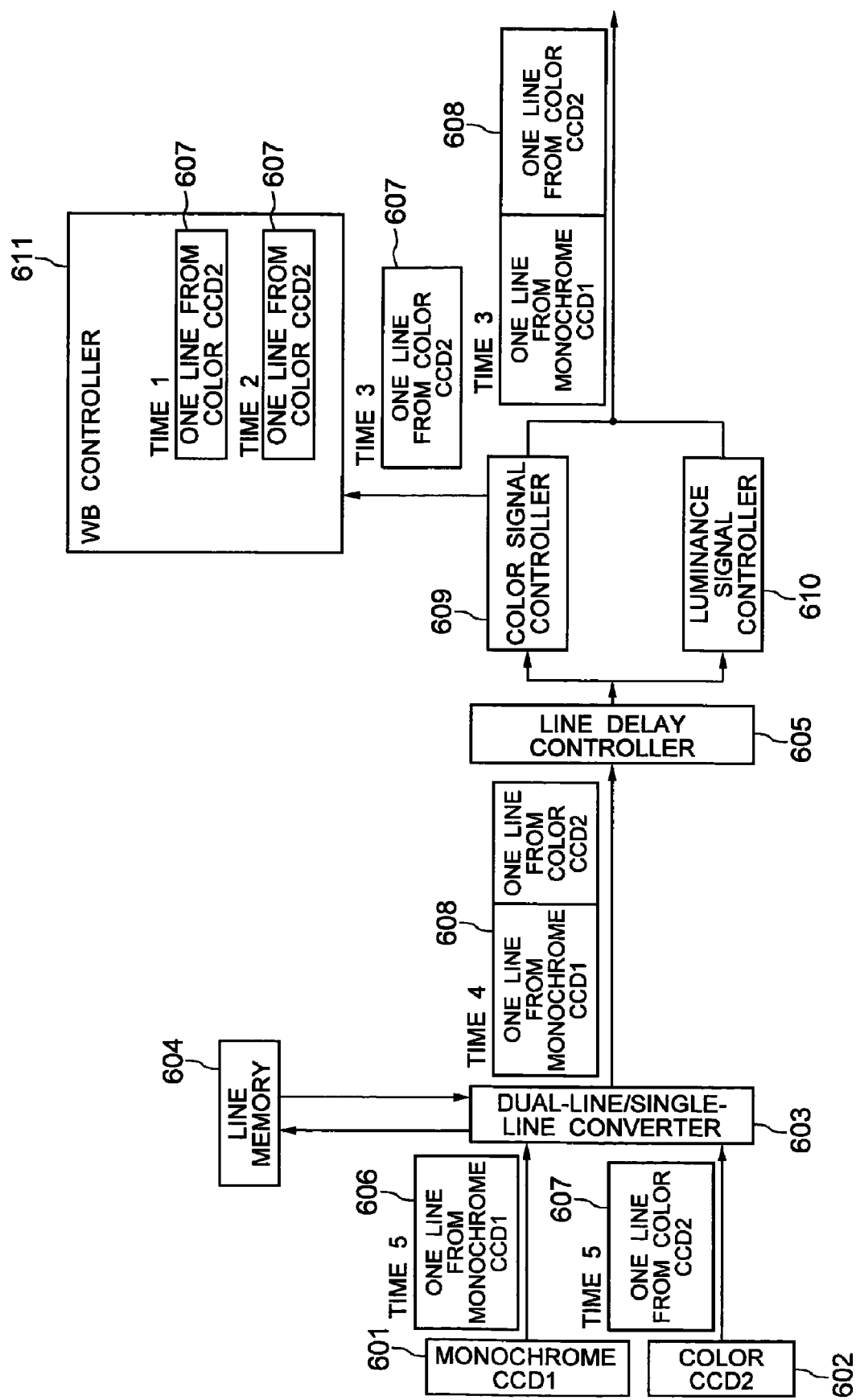
FIG. 6 is a block diagram showing the fifth flow of signals from the two CCDs in this invention.

FIG. 6 shows the flow of signals in the construction of the fifth embodiment. In this case, the signals 606 and 607 from the first and second CCDs 601 and 602 of which one CCD is a monochrome CCD are synthesized to form the composite signal in the first to fourth embodiments, and color signal control means 609 does not make process for the monochrome signal.

In FIG. 6, 608 represents the composite signal formed when dual-line/single-line converter means 603 synthesizes the two signals 606 and 607 of each horizontal line produced from two CCDs 601 and 602. In addition, 609 denotes the color signal processor means that processes only the color signal of the composite signal 608 formed when the two horizontal lines are synthesized.

The dual-line/single-line converter means 603 converts the two signals 606 and 607 to the composite signal 608 in the same way as in the first embodiment of FIG. 2. This composite signal 608 is supplied through a line delay controller 605 to CP processor 609 and YP processor 610. The CP processor 609 does not process the signal produced from the monochrome CCD, but it processes the color signal produced from the color CCD and supplies its output signal to the WB control means 611.

Figure 7:
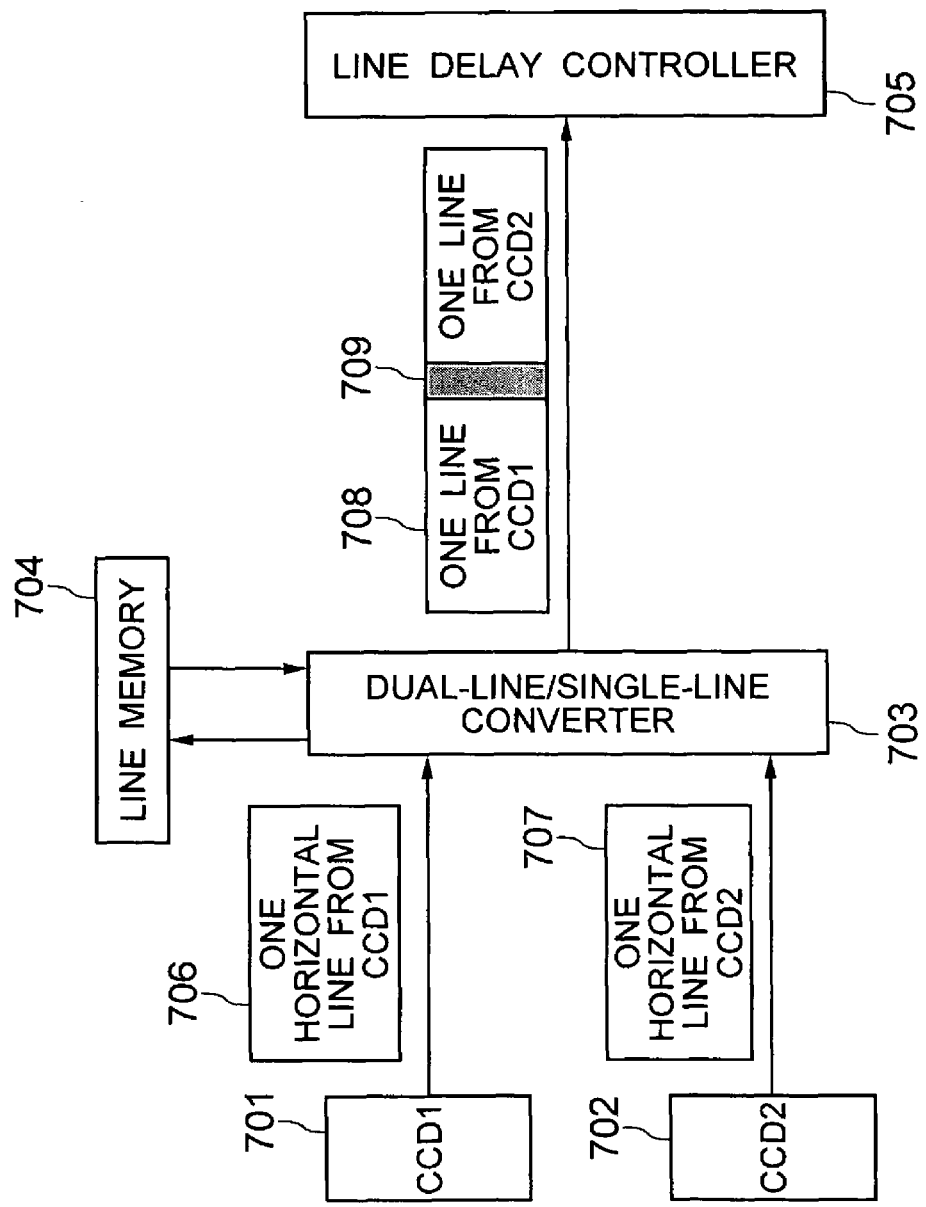
FIG. 7 is a block diagram showing that an identification signal is added to the signals from the two CCDs in this invention.

FIG. 7 shows the flow of signals in the construction of the sixth embodiment. In this case, the signals from the first and second CCDs are synthesized to form the single composite signal as in the first to fourth embodiments, and a signal is added to the composite signal to identify the signals 706 and 707 produced from the first and second CCDs 701 and 702.

In FIG. 7, 708 represents the composite signal formed when dual-line/single-line converter means 703 synthesizes the two signals 706 and 707 of each horizontal line produced from the two CCDs 701 and 702. In addition, reference numeral 709 designates the signal for identifying the second signal.

The signal 706 from the first CCD 701 and the signal 707 from the second CCD 702 are synthesized by using the dual-line/single-line converter means 703 and line memory 704. For example, of the resulting composite signal 708, only the signal 706 from the first CCD 701 can be used or the signals 706 and 707 from the first and second CCDs 701 and 702 can be sequentially switched as in the second to fourth embodiments. Thus, since the signals from the CCDs are required to identify when the two signals 706 and 707 are synthesized by using the dual-line/single-line converter means 703 and line memory 704, a signal of, for example, black is added at the boundary between the two signals 706 and 707 as the identification signal.

Figure 8:
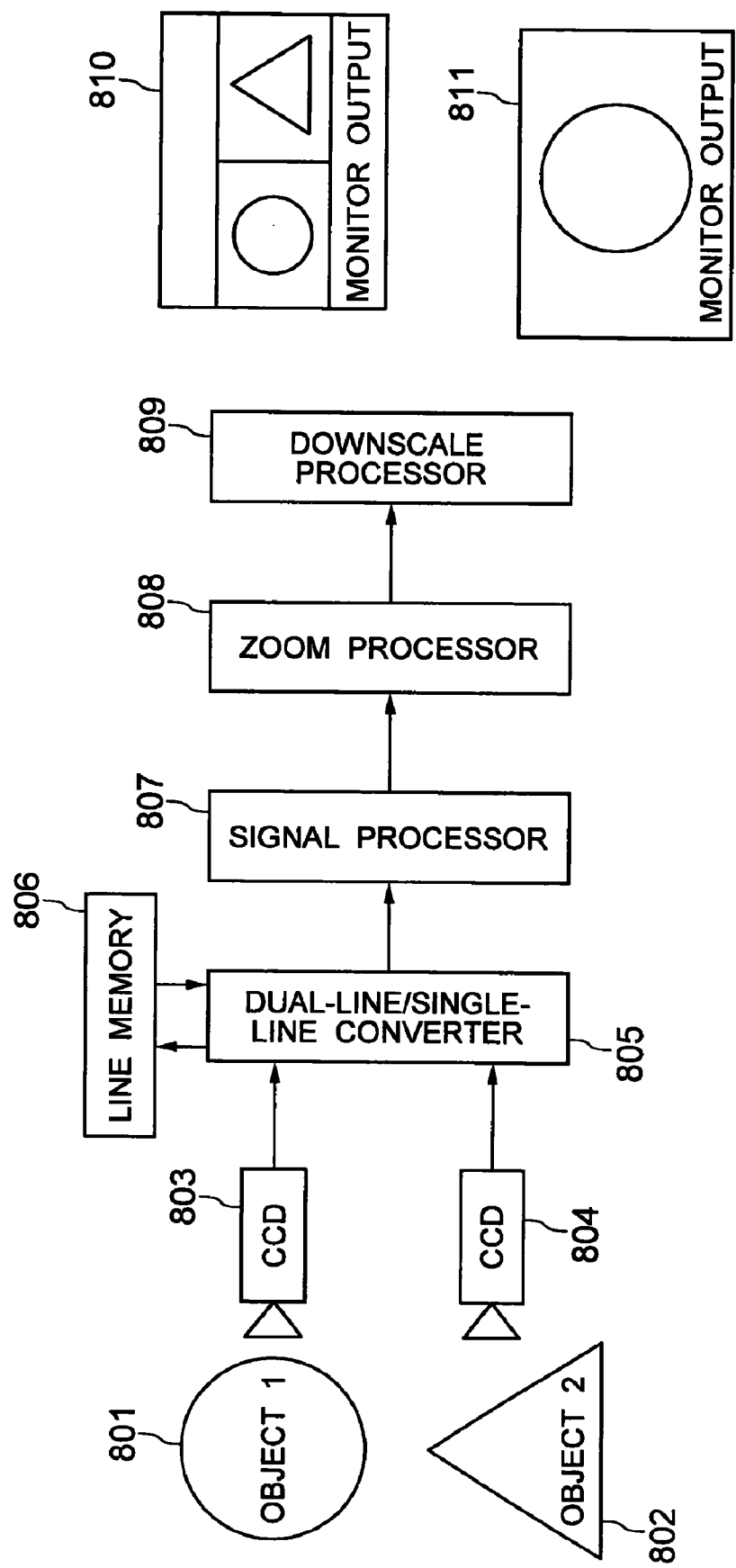
FIG. 8 is a block diagram showing a first method of zooming the signals from the two CCDs in this invention.

FIG. 8 shows the flow of signals in the construction of the seventh embodiment. In this case, the signals from the two CCDs 803 and 804 are synthesized as in the first embodiment and the resulting composite signal is used in the zoom processor means 808 and downscale processor means 809 so that the image signal can be displayed on a monitor.

In FIG. 8, reference numeral 807 represents a signal processor such as the line delay processor or color signal/luminance signal processor used in the first embodiment. In addition, 810 denotes an image seen when the signals produced from the two CCDs are displayed at the same time. 811 is an image seen when one of the signals produced from the two CCDs is displayed.

Figure 9:
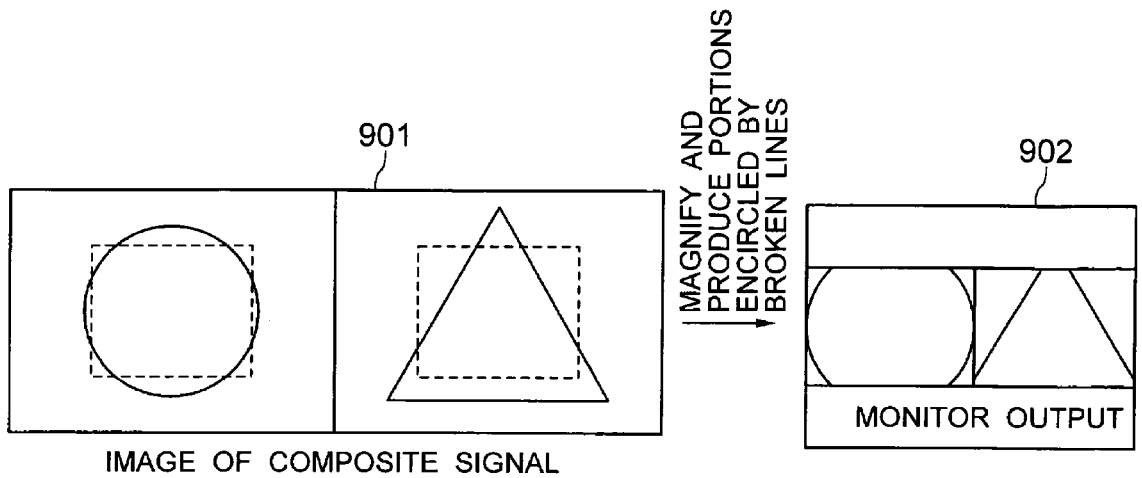
FIG. 9 is a block diagram showing a second method of zooming the signals from the two CCDs in this invention.

FIG. 9 shows magnified and displayed views of the central portions of the respective signals of the composite signal that is formed by synthesizing the signals from the two CCDs as in the first embodiment and displayed as in FIG. 8.

In FIG. 9, 901 represents an image with broken lines superimposed upon the two signals of the composite signal in order that the image parts corresponding to the central portions of the CCDs can be magnified. In addition, 902 denotes an image with those central portions of the two signals magnified as indicated by the broken lines and displayed on a monitor.

Figure 10:
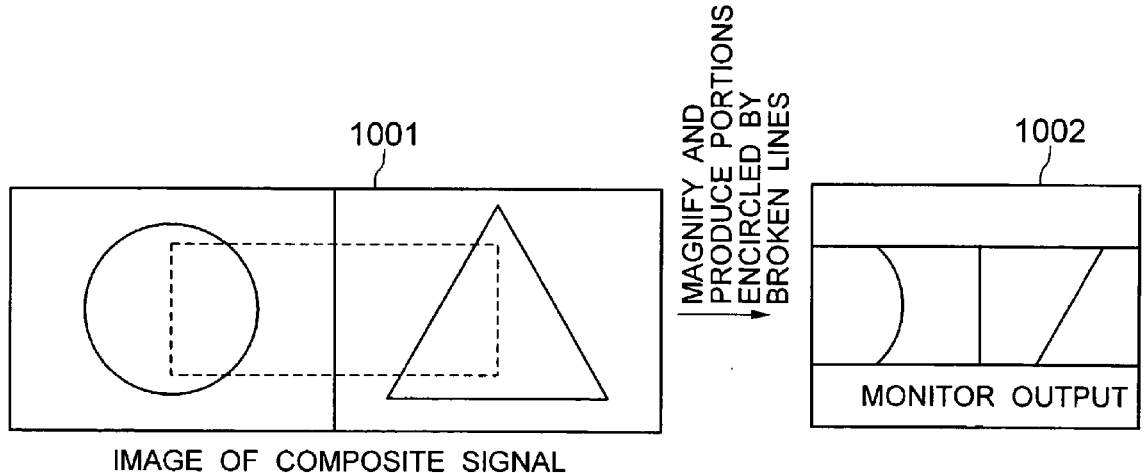
FIG. 10 is a block diagram showing a third method of zooming the signals from the two CCDs in this invention.

FIG. 10 shows magnified and displayed views of the central portion of the whole composite signal that is formed by synthesizing the signals from the two CCDs as in the first embodiment and as displayed in FIG. 8.

In FIG. 10, 1001 represents an image with broken lines superimposed upon the composite signal of the two signals in order that the area indicated by the broken line can be magnified. In addition, 1002 denotes an image with those regions of the composite signal magnified and displayed on a monitor.

First, as illustrated in FIG. 8, when the dual-line/single-line converter means 805 synthesizes the output signals from the two CCDs to form the single composite signal as an image signal, and when the whole image signal is displayed on a monitor at a time, the composite signal is changed in its size by using the downscale processor 809. Then, an object image 801 produced from the first CCD 803 and an object image 802 produced from the second CCD 804 are displayed at a time on the monitor screen. At this time, if the two CCD signals are processed with their aspect ratios kept constant, an image 810 can be displayed on the central area of the monitor screen with zero-signal zones left on the top and bottom sides as illustrated.

Similarly, as shown in FIG. 8, when only the signal produced from one of the two CCDs is displayed, only the first-CCD signal or second-CCD signal of the composite signal formed by synthesizing the signals produced from the two CCDs, for example, the first-CCD signal, or the object image 801 is passed through the zoom processor means 808 and downscale processor means 809 so that it can be displayed as an image 811 on the monitor.

When the central area of each of the object images produced from the two CCDs is magnified and displayed as illustrated in FIG. 9, the composite signal 901 to which the signals produced from the two CCDs are converted by the dual-line/single-line converter means is processed for zoom over the central areas of first-CCD signal and second-CCD signal as indicated by the broken lines. The zoomed areas of those two CCD signals can be displayed on the monitor as an image 902.

When the central area of the whole composite signal formed by synthesizing the first-CCD signal and second-CCD signal is magnified and displayed, the whole composite signal 1001 including the signals produced from the first and second CCDs is processed for magnification over the central area as indicated by the broken line. The zoomed area of this composite signal can be displayed on the monitor as an image 1002.

Figure 11:
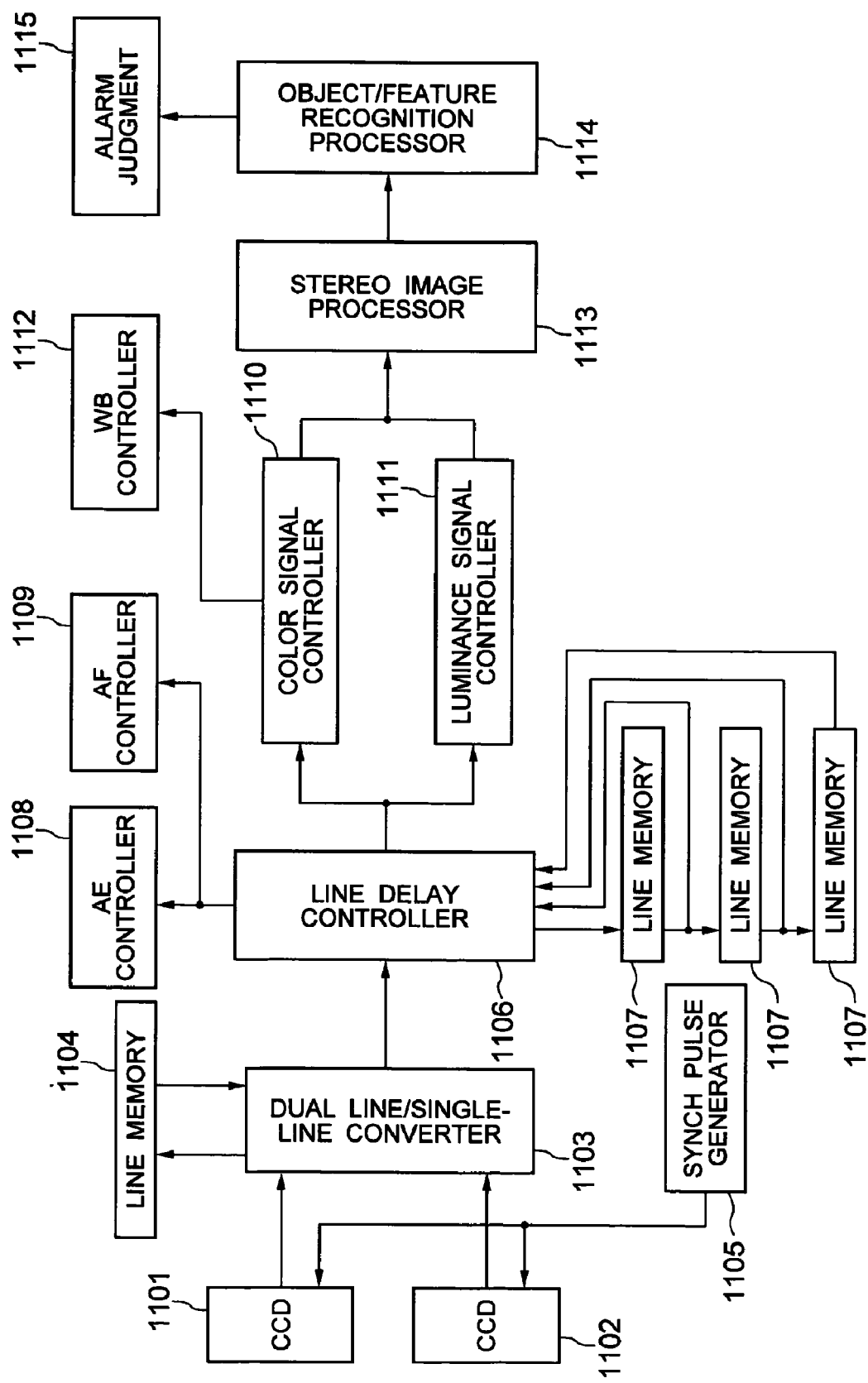
FIG. 11 is a block diagram showing the construction of the eighth embodiment of an imaging apparatus according to the invention.

FIG. 11 shows the construction of the eighth embodiment that has alarm judgment means 1115 provided to recognize the status, for example, abnormal state of the picked-up object image from the result that the object/feature recognition processor means has produced as in the first embodiment of FIG. 1, and to alarm.

In FIG. 11, the elements 1101 through 1113 are the same as the elements 101 through 113 in the first embodiment. The alarm judgment means 1115 is provided as illustrated.

In the construction shown in FIG. 11, as in the first embodiment of FIG. 1, the object/feature recognition means measures distance, and recognizes the objects and features from the object images taken by the first CCD 1101 and second CCD 1102. The alarm judgment means 1115 judges whether or not the object is in an abnormal condition. If the object is judged abnormal, the alarm judgment means alarms.

According to the embodiments mentioned above, since the output signals from a plurality of imaging devices are not processed in a time-sharing manner, the dynamic resolution can be kept high. Also, since the signals simultaneously produced from the plurality of imaging devices can be processed at a time without adding elements corresponding to the number of imagers used, the number of parts used in the imaging apparatus can be reduced, and the cost and consumption power of the imaging apparatus can be decreased.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

The invention claimed is:

1. An imaging apparatus comprising:
   two imaging devices;
   a converter module which synthesizes two signals of each horizontal line produced from said two imaging devices to thereby convert said two signals to a single composite signal;
   a line memory which cooperates with said converter module to convert said two signals;
   a line delay module which accumulates the signals produced from said converter module;
   a line memory which cooperates with said line delay module to accumulate said signals from said converter module;
   an exposure controller;
   an auto focus controller;
   a white balance controller;
   a color signal processor module;
   a luminance signal processor module;
   a stereo imaging processor module which makes arithmetic operation for stereo imaging; and
   an object/feature recognition-processing module to recognize objects and features.

2. An imaging apparatus according to claim 1, wherein said apparatus is constructed by said two imaging devices and a one-channel signal processor including said other elements.

3. An imaging apparatus according to claim 1, wherein said exposure controller, said auto focus controller and said white balance controller make control by using only one component signal of said composite signal formed by said converter module.

4. An imaging apparatus according to claim 1, wherein said exposure controller, said auto focus controller and said white balance controller make control by using the average of said two component signals of said composite signal formed by said converter module.

5. An imaging apparatus according to claim 1, wherein said exposure controller, said auto focus controller and said white balance controller make control by using an alternate one of said two component signals of said composite signal formed by said converter module.

6. An imaging apparatus according to claim 1, wherein when either one or both of said two imaging devices are monochrome, said color signal processor module does not make color signal processing for the signal or signals from said monochrome imaging device or devices.

7. An imaging apparatus according to claim 1, wherein a boundary signal for identifying said signals from said imaging devices is added at the boundary between said component signals of said single composite signal formed by said converter module.

8. An imaging apparatus according to claim 1, wherein an alarm judgment processor module is provided to judge the status of an imaged object by using information of the object recognized by said object/feature recognition processor module.

9. An imaging apparatus according to claim 1, wherein when said two component signals of said single composite signal formed by said converter module are displayed on a monitor screen, said two signals from said two imaging devices are both displayed with a correct aspect ratio by using zoom processor module or downscale processor module.

10. An imaging apparatus according to claim 1, wherein when said single composite signal into which said signals from said two imaging devices are converted by said converter module is displayed on a monitor screen, one of the two component signals is selected from said composite signal and displayed on said monitor screen.

11. An imaging apparatus according to claim 1, wherein when said single composite signal into which said signals from said two imaging devices are converted by said converter module is zoomed, said single composite signal is zoomed over an arbitrarily selected area of said composite signal.

* * * * *